United States Patent [19]

St. Clair et al.

[11] Patent Number: 4,783,504

[45] Date of Patent: Nov. 8, 1988

[54] HOT MELT ADHESIVE CONTAINING A SILANE GRAFTED HYDROGENATED BLOCK POLYMER

[75] Inventors: David J. St. Clair; Steven S. Chin, both of Houston, Tex.

[73] Assignee: Shell Oil Company, Houston, Tex.

[21] Appl. No.: 835,090

[22] Filed: Feb. 28, 1986

[51] Int. Cl.$^4$ .................. C08L 51/00; C08L 53/02
[52] U.S. Cl. .................. 525/72; 524/270; 524/271; 524/274; 525/86; 525/288
[58] Field of Search .................. 525/71, 72, 86, 89, 525/288; 524/270, 271, 274

[56] References Cited

U.S. PATENT DOCUMENTS

| | | | |
|---|---|---|---|
| 3,925,947 | 6/1972 | Meyers et al. | |
| 3,992,339 | 5/1975 | Harlan et al. | |
| 4,007,311 | 2/1977 | Harlan | 428/246 |
| 4,076,914 | 2/1978 | Moczygemba et al. | 526/25 |
| 4,076,915 | 2/1978 | Trepka | 526/25 |
| 4,113,914 | 9/1978 | Doss | 428/355 |
| 4,169,822 | 5/1978 | Meyers et al. | |
| 4,248,986 | 2/1981 | Lal et al. | 525/359 |
| 4,256,232 | 10/1981 | Hannon et al. | |
| 4,296,008 | 10/1981 | St. Clair et al. | 260/27 |
| 4,320,214 | 3/1982 | Harayama et al. | 525/264 |
| 4,366,107 | 12/1982 | Voigt et al. | 264/25 |
| 4,429,076 | 1/1984 | Saito et al. | 525/57 |

FOREIGN PATENT DOCUMENTS

| | | | |
|---|---|---|---|
| 114380A | 12/1982 | European Pat. Off. | |
| 3246443 | 12/1981 | Fed. Rep. of Germany | |
| 0165973 | 12/1980 | Japan | 525/71 |
| 8132032 | 1/1982 | Japan | |
| 8225103 | 6/1982 | Japan | |

*Primary Examiner*—Wilbert J. Briggs, Sr.
*Attorney, Agent, or Firm*—Keith M. Tackett

[57] ABSTRACT

A sealant composition comprising:
 (a) 100 parts by weight of a silane functionalized polymer component which is prepared by reacting enough silane of the general formula R R'$_n$ SiY$_{3-n}$ (where n equals 0, 1 or 2 and where R is a non-hydrolyzable organic group which is capable of grafting onto the polymer, R' is a non-hydrolyzable organic group incapable of grafting onto the polymer and Y is a hydrolyzable organic group) with a polymer component to thereby functionalize the polymer component and provide a resultant sealant composition with adhesion which is resistant to deterioration in the presence of water;
  said polymer component comprising an A'B' block copolymer, a multiblock copolymer having at least two end blocks A and at least one midblock B, or mixtures of an A'B' block copolymer and the multiblock copolymer wherein:
  the A' and A blocks comprise monoalkenyl arene blocks and the B' and B blocks comprise substantially completely hydrogenated conjugated diene polymer blocks, and the average molecular weight of the A and A' blocks is greater than the minimum molecular weight needed to obtain microphase separation and domain formation of the A and A' blocks, and is less than the maximum molecular weight which would render the polymer incapable of being melt processed;
  the multiblock copolymer comprises a monoalkenyl arene content no more than a maximum weight percent needed to retain a modulus suitable as a sealant for the resultant composition and no less than a minimum weight percent needed to obtain the desired phase separation and the desired minimum cohesive strength for the resultant composition;
 (b) an amount of a midblock compatible component wherein said midblock compatible component is at a concentration to maintain the resultant composition in a plyable condition at room temperature and to maintain the glass transition temperature of the resultant composition below 10° C.

15 Claims, No Drawings

HOT MELT ADHESIVE CONTAINING A SILANE GRAFTED HYDROGENATED BLOCK POLYMER

BACKGROUND OF THE INVENTION

Numerous sealant compositions are known in the literature. One of the basic patents in this field is Harlan, U.S. Pat. No. 3,239,478, which shows combinations of styrene-diene block copolymers with tackifying resins and the like to produce a wide variety of sealants and adhesives. Further, it is known that butyl rubbers can be used in a variety of adhesives, sealants and coatings. It has been known that these butyl rubber compounds do not adhere well to polar substrates, especially in the presence of water, since the butyl rubber does not form strong chemical bonds to polar substrates.

U.S. Pat. No. 3,984,369, also issued to Harlan, recognized this phenomenon and attempted to provide a sealant composition which improved the adhesive qualities of the base butyl rubber compound. This composition covers a formulation which comprised 3 to 30 weight percent of a block copolymer, 2 to 40 weight percent of butyl rubber, 10 to 70 weight percent of a plasticizing oil having a solubility parameter ranging from 6 to 8, about 1 to 50 weight percent of an adhesion promoting resin having a solubility parameter ranging from about 8 to about 12, about 1 to about 70 weight percent of an inorganic filler and about 0.01 to about 2.0 weight percent of an ultraviolet/oxidation (UV/oxidation) stabilizer or a mixture of UV/oxidation stabilizers. This composition gave better adhesion and lower melt viscosity than previously taught similar compositions by teaching the use of a primer containing a silane coupling agent. This invention had the disadvantage that the added silane coupling agent is migratory in character. In particular, for hot melt sealants, a migratory silane may be lost during processing because of its volatility at the high temperatures required for mixing and applying hot melt sealants. In hot melt sealants for insulated glass or for headlight assembly, the migratory silane may cause fogging between the panes of insulated glass or on the inside of the headlight assembly. In certain coatings for glass bottles, the migratory silane may cause an odor which is objectionable. In coatings for electrical components the migratory silane can cause excessive corrosion.

U.S. Pat. No. 4,113,914 to Doss claims a process for applying a sealing composition to at least a portion of an area between two surfaces wherein the composition comprises:

(a) 100 parts by weight of a block copolymer selected from the group consisting of: aa. polymers of the structural formula $(S\text{---}D)_mY$, bb. polymers of the structural formula $(S\text{---}D')_nY$, and cc. polymers of the structural formula $S\text{---}D'\text{---}S$, wherein S is a block of polymerized styrene, D is a block of polymerized butadiene or isoprene, D' is a hydrogenated block of polymerized butadiene or isoprene, Y is a residue of a polyfunctional coupling agent or of a polyfunctional initiating agent, m is an integer of about 2, n is an integer of 2 or more, the block copolymer having a weight average molecular weight of 200,000 to 750,000 for polymers aa., 50,000 to 500,000 for polymers bb. and cc., (b) 1 to 30 parts by weight of an epoxy resin, (c) 10 to 250 parts by weight of a modifying resin, (d) 25 to 250 parts by weight of a filler.

The application also claims an article produced in accordance with the process claimed. This process for applying the sealant and the subsequent article produced using the process involves a sealant composition with hydrogenated styrene diene block copolymers and the use of an organosilane coupling agent for improving the adhesion of the sealant to glass after water immersion. Like the composition taught by Harlan in U.S. Pat. No. 3,984,369, this added silane coupling agent is also migratory in character and for hot melt sealants, the migratory silane may be lost during processing because of its volatility at high temperatures which is required for mixing and applying the hot melt sealants. Additionally, like the sealant of U.S. Pat. No. 3,984,369, the low flash point of the migratory silane may prohibit its use in some hot melt applications because of safety considerations, including a fire hazard.

U.S. Pat. No. 4,296,008, issued to St. Clair et al claims essentially the basic sealant composition for which the instant invention is an improvement. In '008, St. Clair et al claim a formulation which contains about 0.1 to about 10 parts of a silane coupling agent. This silane coupling agent is not bound covalently to the block polymer and therefore is migratory in character. The instant invention is intended to provide a sealant composition with a silane grafted polymer component which eliminates the need for a migratory silane coupling agent.

A novel sealant composition has now been discovered which avoids the problems produced by the migratory silane.

SUMMARY OF THE INVENTION

The present invention broadly comprises a sealant composition possessing good UV stability and oxidative stability, and good adhesion. In some cases the proper rheology requires the sealing composition to be capable of low melt viscosity, along with the cohesive failure mechanism and in other cases thixotropic characteristics are provided by the inventive sealant composition without migrating silane disadvantages.

The invention involves a sealant composition comprising:

(a) 100 parts by weight of a silane functionalized polymer component which is prepared by reacting enough silane of the general formula $RR'_nSiY_{3-n}$ (where n is 0, 1 or 2 and where R is a non-hydrolyzable organic group which is capable of grafting onto the polymer, R' is a non-hydrolyzable organic group incapable of grafting onto the polymer and Y is a hydrolyzable organic group) with a polymer component to thereby functionalize the polymer component and provide a resultant sealant composition with adhesion which is resistant to deterioration in the presence of water;

said polymer component comprising an A'B' block copolymer, a multiblock copolymer having at least two end blocks A and at least one midblock B, or blends of an A'B' block copolymer and the multiblock copolymer wherein:

the A' and A blocks comprise monoalkenyl arene blocks and the B' and B blocks comprise substantially completely hydrogenated conjugated diene polymer blocks, and the average molecular weight of the A and A' blocks is greater than the minimum molecular weight needed to obtain microphase separation and domain formation of the A and A' blocks, and is less than the maximum molecular weight which would render the polymer incapable of being melt processed, the multiblock copolymer comprises a monoalkenyl arene content which is no more than the maximum weight percent needed to retain a modulus suitable as a sealant in the resultant composition and no less than the minimum weight percent needed to obtain the desired phase separation and the desired cohesive strength;

an amount of a midblock compatible component wherein said midblock compatible component is at a concentration to maintain the resultant composition in a pliable condition at room temperature and to maintain the glass transition temperature of the resultant composition below 10° C.

The midblock compatible component can be either a midblock compatible resin or a midblock compatible plasticizer or mixtures thereof. When a midblock compatible component is included in the formulation, up to about 400 parts by weight of the midblock compatible component is used. When mixtures of midblock compatible components are used, the total may be included in the formulation at up to 800 parts by weight.

The silane functionalized polymer component preferably comprises an A′B′ block copolymer and a multiblock copolymer having at least two endblocks A and at least one midblock B as described, wherein the average molecular weights of the A and A′ blocks are between about 3000 and about 40,000 and the multiblock copolymer has a monoalkenyl arene content of between about 7% and about 45% by weight. The most preferred weight percent of the monoalkenyl arene of the multiblock copolymer is between 10% and 30%wt.

Other hydrogenated polymers may serve as the starting polymer component. These can include multiarmed polymers such as (A—B)a—Y—(C—A)b or (A—B)x—Y—Cy where A is a poly(monoalkenylarene) block, B and c are poly(conjugated diene) blocks and Y is the residue of a multifunctional coupling agent. If A=styrene, B=isoprene, C=butadiene for example, these structure would be (S—I)a—Y—(B—S)b or (S—I)x—Y—By.

The sealant may also contain an enblock compatible component at a concentration which is less than the solubility limit of the component in the polymer with utility to maintain the cohesive qualities of the resultant composition at elevated temperatures;

Additional components may be present in the sealant, including up to about 900 parts by weight of a filler, an antioxidant, a solvent, an ultraviolet stabilizer, a silanol condensation catalyst, and a thixotroping agent.

DETAILED DESCRIPTION OF THE INVENTION

The term "silane functionalized polymer component" refers to the combination of a multiblock copolymer and an A′B′ block copolymer reacted with a silane, such as the copolymer described in Japanese Pat. No. 58,225,103, owned by Sumitomo Bakelite Co., Ltd, laid open Dec. 27, 1983. Sumitomo Bakelite teaches the preparation of the desired component by reacting a hydrogenated styrene-butadiene-styrene copolymer with a silane of the general formula $RR'SiY_2$ (where R is a nonhydrolyzable organic group, Y is a hydrolyzable organic group and R′ is either an R or Y group) at $\geq 140°$ C. in the presence of an organic peroxide (half-life of $\leq 6$ minutes at the reaction temperature) capable of generating free radicals in the hydrogenated styrene-butadiene-styrene copolymer. This component can be produced using the usual equipment for processing hydrogenated styrene-butadiene-styrene copolymers under normal processing conditions. The silane grafted polymer may be contacted with water in the presence of a silanol condensation catalyst in order to obtain a crosslinked hydrogenated styrene-butadiene-styrene copolymer product.

For the present invention, the copolymer preferably has a weight percent of about 10% to about 30% styrene.

In the general formula $RR'_nSiY_{3-n}$, where n is 0, 1 or 2, for the silane used in the present invention, R is a non-hydrolyzable organic group which is capable of grafting onto the polymer, R′ is a non-hydrolyzable organic group incapable of grafting onto the polymer and Y is a hydrolyzable organic group. Examples of the R group are vinyl, allyl, butenyl, cyclohexenyl, cyclopentadienyl, methacryloxypropyl, etc. Vinyl is the most preferred. Examples of the Y group include alkoxy groups such as methoxy, ethoxy, butoxy, acyloxy groups such as formyloxy group, acetoxy, propionoxy; and oxime groups such as $—ON=C(CH_3)_2$, $—ON=C(C_6H_5)_2$; alkylamino groups, arylamino groups. Preferred silane compounds of the above described general formula include vinyltrimethoxysilane (VTMS) and vinyltriethoxysilane (VTES).

The amount of silane compound to be added to the copolymer component depends on the desired degree of crosslinking. From about 0.1 wt% to about 20 wt% of silane is used. Preferably, from about 0.5 wt% to about 10 wt% of silane is used.

The silane-functionalized polymer component is prepared using a free radical generator which consists of an organic peroxide which can generate free radicals in a typical hydrogenated styrene-butadiene-styrene copolymer at a reaction temperature resulting in a half-life of $\leq 6$ minutes and preferably less than 1 minute at the reaction temperature. Typical examples of organo peroxides are dialkyl peroxides such as dicumyl peroxide and 1,3-bis(tert-butylperoxyisopropyl)benzene. Other peroxides such as diacyl peroxides, alkyl peresters and percarbonates may be suitable for initiating graft sites on the polymer.

The amount of free radical generator to be added to facilitate the functionalization of the polymer component depends on the properties (copolymer composition and melt index) of the hydrogenated styrene-butadiene-styrene copolymer used and the desired degree of crosslinking as well as on the type of free radical generator. From about 0.01 wt% to about 3 wt% of free radical generator is added. Preferably from about 0.05 wt/% to about 1.5% of free radical generator is used.

In the first step of preparing the novel sealant composition of the present invention, the reaction between the hydrogenated styrene-butadiene-styrene copolymer and silane is executed in the temperature range between 140° C. up to the decomposition temperature of the hydrogenated styrene-butadiene-styrene copolymer. This reaction can be carried out in any appropriate device as long as an adequate dispersion of the added material and an adequate temperature of the kneaded material are achieved. For example, single or double screw extruders, the Ko-Kneader, the Banbury mixer or roll mills, may be used within the scope of the invention.

The silane modified block copolymer component by itself lacks the require adhesion needed for a sealant composition. Therefore, it is necessary to add an adhesion promoting or tackifying resin that is compatible with the elastomeric hydrogenated conjugated diene block. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins, and polymerized mixed olefins. To obtain good ultraviolet resistance, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 made by Arco. The amount of rubber compounding oil employed in the inventive composition can vary from 0 to about 100 phr, and preferably between about 0 to about 60 phr.

Optionally, an endblock-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of endblock compatible resins having high and low softening points may also be used. Useful resins include coumaroneindene resins, polystyrene resins, vinyl toluene-alphamethylstyrene copolymers, and polyindene resins. An alphamethylstyrene resin is most preferred. The amount of endblock-compatible resin can vary from 0 to about 200 phr.

A silanol condensation catalyst such as an organometallic compound may be included in the formulation to accelerate the cross-linking reaction of the silane-modified hydrogenated styrene-butadiene-styrene copolymer. Examples of this catalyst include organotin compounds such as dibutyltin dilaurate, dibutyltin dioctoate and dibutyltin diacetate. Among these, dibutyltin diacetate and dibutyltin dilaurate are preferred.

The desired silane functionalized polymer component, with its non-migratory silane component is usually a one component compound consisting of a silane-modified hydrogenated styrene-butadiene-styrene copolymer. However, it is also contemplated that a two component mixture can be used as the silane functionalized polymer component. In these situations, the two components would include a silane modified hydrogenated styrene-butadiene-styrene copolymer and a hydrogenated styrene-butadiene-styrene copolymer which contains the silanol condensation catalyst but which has not been modified with silane. The two component mixture should be properly mixed and kneaded in the appropriate ratio to form a composition which forms siloxane linkages in the presence of water, with the preferred mixing proportion consisting of 23 10 wt% of the second component based on the total mixed composition.

The compositions of this invention may be modified with supplementary materials including oxidation/UV stabilizers, pigments and fillers, such as calcium carbonate, talc, clay, aluminum trihydrate (an accelerator) or zinc oxide (a retarder).

For some applications it may be desirable to apply the sealant as a hot melt. In those situations, no additional solvents or carriers are required.

In other situations, it may be desirable to employ the novel sealant at ambient temperatures. In those situations additional solvents or carriers are added. Suitable carrier materials include organic solvents such as hexanes, naphthas, mineral spirits, and toluene, ester solvents such as ethyl acetate and propyl acetate, and ketone solvents such as methyl ethyl ketone and methyl isobutyl ketone. The amount of solvent added can vary from 0 to about 400 phr, and preferably from 0 to about 200 phr.

The sealants used in the following illustrative embodiments generally have the combination of properties which are normally found in relatively soft, elastomeric sealants. All of the sealants in the illustrative embodiment examples had Shore A hardness in the 15 to 50 range. The critical test which distinguishes sealants made with conventional technology from the novel sealants of this invention is the 180° peel test of the sealant on glass. This test is run according to the testing procedure given in Federal Specification TT-S-00230C. Test samples made with the solvent based sealants were prepared according to the procedure given in TT-S-00230C, applying the sealant and curing it for 21 days prior to testing. Test samples made with the hot melt sealants were prepared according to the procedure given in TT-S-00230C except that the sealants were applied with a standard hot melt applicator. After the sealants cool, they are conditioned 24 hours at standard conditions before testing.

The invention is further illustrated by means of the following illustrative embodiments, which are given for the purpose of illustration only and are not meant to limit the invention to the particular components and amounts disclosed.

ILLUSTRATIVE EMBODIMENT I

The polymers used to illustrate the invention are shown in Table 1. Polymers 1 and 2 are unfunctionalized KRATON G1652 and G1726X. KRATON G1652 and KRATON G1726X are A—B/A—B—A type block polymers where A is polystyrene and B is hydrogenated polybutadiene. Both polymers contain 30%wt. polystyrene. KRATON G1652 and KRATON G1726X contain a 0/100 and a 70/30 ratio of A—B/A—B—A, respectively. These polymers are included to illustrate the performance which can be achieved with conventional, prior art technology. The polymers used to illustrate the present invention are polymers 3, 4, 5 and 6 in Table 1. Polymers 3, 4 and 5 have been silane grafted by extruding the KRATON G polymers with silane and peroxide using a 30 mm corotating twin screw extruder.

The amount of silane actually grafted onto the polymers was 1.3% wt. to 2.0%wt. The temperature profile in the extruder during grafting varied from about 150° C. at the feed port to about 250° C. at the exit.

ILLUSTRATIVE EMBODIMENT II

The use of the silane grafted polymers in a solvent based sealant is illustrated by the results in Table 2. Results on Formulation A show that a sealant containing no added or grafted silane has good initial adhesion but that the bond to glass is destroyed by immersing the bonded assembly in water for 1 week at 25° C. Technology taught in earlier patents is demonstrated by Formulation B in Table 2. In Formulation B, an ungrafted silane has been added to Formulation 1. Results show that the ungrafted silane prevents the bond of the sealant to glass from being destroyed by water immersion. Formulation C in Table 2 demonstrates that a silane, grafted onto the polymer according to the present invention, remains just as effective as an ungrafted silane in protecting the bond of the sealant against destruction by water immersion.

ILLUSTRATIVE EMBODIMENT III

The use of the silane grafted polymers in a hot melt sealant is illustrated by the results in Table 3. Formulations D and F in Table 3 use ungrafted KRATON G polymers as taught by conventional, prior art technology. Results in Table 3 show that the initial bond of the hot melt sealant is good. However, the bond is drastically weakened or destroyed by immersion of the bonded assembly in water. Results on Formulation E in Table 3 show that by using a silane grafted polymer of the present invention, a hot melt sealant can be prepared which not only has good initial adhesion to glass but also has a bond which withstands water immersion. Results on Formulation G in Table 3 show that a hot melt sealant based on a silane grafted polymer when used in combination with a silanol condensation catalyst also gives a good initial bond to glass and that the bond is maintained during water immersion.

ILLUSTRATIVE EMBODIMENT IV

Results in Table 4 show the effectiveness of two different silanes grafted onto the KRATON G polymer. Formulations H and I in Table 3 are based on KRATON G1652 Rubber grafted with vinyl triethoxy silane and vinyl trimethoxy silane, respectively. Formulations J and K show the same two polymers used in hot melt sealants which also contain the silanol condensation catalyst. Results show that either silane can be grafted onto the polymer and will be effective in preventing the bond of a hot melt sealant to glass from being destroyed by immersion in water.

TABLE 1

|  | 1 | 2 | 3 | 4 | 5 | 6 |
|---|---|---|---|---|---|---|
| KRATON G1652 Rubber[a] | 100 | — | 100 | — | 100 | 100 |
| KRATON G1726X Rubber[a] | — | 100 | — | 100 | — | — |
| Vinyl-tri-ethoxy-silane (Silane A-151)[b] | — | — | 3 | 3 | — | — |
| Vinyl-tri-methoxy-silane (Silane A-171)[b] | — | — | — | — | 3 | — |
| Peroxide (Lupersol 101)[c] | — | — | 0.1 | 0.1 | 0.1 | — |
| Condensation Catalyst (Dibutyl Tin Diluarate) | — | — | — | — | — | 2 |

[a]Product from Shell Chemical Co.
[b]Product from Union Carbide Co.
[c]Product from Pennwalt.

TABLE 2

| Formulation | A | B | C |
|---|---|---|---|
| Polymer 1 | 16.6 | 16.6 | — |
| Polymer 3 | — | — | 16.6 |
| Midblock Resin (Arkon P-85)[a] | 34.6 | 34.6 | 34.6 |
| Midblock Plasticizer (Indopol H-300)[b] | 3.7 | 3.7 | 3.7 |
| Antioxidant (Irganox 1010)[c] | 0.3 | 0.3 | 0.3 |
| Mercapto Silane (Silane A-189)[d] | — | 0.5 | — |
| Thixotropic Agent (Cab-O-Sil)[e] | 8.0 | 8.0 | 8.0 |
| Solvent (Toluene) | 36.8 | 36.8 | 36.8 |
| Properties |  |  |  |
| 180° Peel on Glass |  |  |  |
| Before water soak, pli | 18 | 14 | 32 |
| After 7 days in water @ 25° C., pli | 1 | 23 | 21 |

[a]Product from ARAKAWA Chemical Co.
[b]Product from AMOCO Chemical Co.
[c]Product from Ciba Geigy.
[d]Product from Union Carbide Co.
[e]Product from Cabot Corp.

TABLE 3

| Formulation | D | E | F | G |
|---|---|---|---|---|
| Polymer 1 | 6.8 | — | 23.6 | — |
| Polymer 2 | 15.7 | — | — | — |
| Polymer 3 | — | 6.8 | — | 21.3 |
| Polymer 4 | — | 15.7 | — | — |
| Polymer 6 | — | — | — | 1.1 |
| Midblock Resin (Regalrez 1018)[a] | 60.6 | 60.6 | 63.8 | 63.8 |
| Endblock Resin (Endex 160)[a] | 12.1 | 12.1 | 11.8 | 11.8 |
| Polypropylene (Shell DX 5088)[b] | 4.1 | 4.1 | — | — |
| Stabilizer (Irganox 1010)[c] | .2 | .2 | .2 | .2 |
| Stabilizer (Tinuvin 770)[c] | .2 | .2 | .2 | .2 |
| Stabilizer (Tinuvin P)[c] | .3 | 3 | .4 | .4 |
| Properties |  |  |  |  |
| 180° Peel on Glass |  |  |  |  |
| Before Water Soak, pli | 39 c | 38 c | 25 | 38 |
| After 7 days in Water @ 25° C., pli | 7 | 42 | 0 | 0 |
| After 2 days in Water @ 70° C., pli | — | — | 0 | 61 | c: cohesive failure
[a]Product from Hercules, Inc.
[b]Product from Shell Chemical Co.
[c]Product from Ciba Geigy.

TABLE 4

| Formulation | H | I | J | K |
|---|---|---|---|---|
| Polymer 3 | 23.5 | — | 21.3 | — |
| Polymer 5 | — | 23.5 | — | 21.3 |
| Polymer 6 | — | — | 1.1 | 1.1 |
| Midblock Resin (Regalrez 1018) | 63.8 | 63.8 | 63.8 | 63.8 |

TABLE 4-continued

| | H | I | J | K |
|---|---|---|---|---|
| Endblock Resin (Endex 160) | 11.8 | 11.8 | 11.8 | 11.8 |
| Stabilizer (Irganox 1010) | .2 | .2 | .2 | .2 |
| Stabilizer (Tinuvin 770) | .2 | .2 | .2 | .2 |
| Stabilizer (Tinuvin P) | .4 | .4 | .4 | .4 |
| Properties | | | | |
| 180° Peel on Glass | | | | |
| Before Water Soak, pli | 41 | 21 | 17 | 28 |
| After 7 days in water @ 70° C., pli | 47 | 41 | — | — |
| After 2 days in water @ 70° C., pli | — | — | 95 | 95 |

What is claimed:

1. A hot melt adhesive composition having no added solvents comprising:
   (a) 100 parts by weight of a silane functionalized polymer component which is prepared by grafting enough silane of the general formula $RR'_nSiY_{3-n}$ (where n equals 0, 1 or 2 and where R is a non-hydrolyzable organic group which is capable of grafting onto the polymer, R' is a non-hydrolyzable organic group incapable of grafting onto the polymer and Y is a hydrolyzable organic group) onto a polymer component to thereby functionalize the polymer component for use in a solventless hot melt adhesive composition having adhesion which is resistant to deterioration in the presence of water;
   said polymer component comprising an A'B' block copolymer, a multiblock copolymer having at least two end blocks A and at least one midblock B, or mixtures of an A'B' block copolymer and the multiblock copolymer wherein:
   the A' and A blocks comprise monoalkenyl arene blocks and the B' and B blocks comprise substantially completely hydrogenated conjugated diene polymer blocks, and the average molecular weight of the A and A' blocks is greater than the minimum molecular weight needed to obtain microphase separation and domain formation of the A and A' blocks, and is less than the maximum molecular weight which would render the polymer incapable of being melt processed;
   the multiblock copolymer comprises a monoalkenyl arene content which is no more than the maximum weight percent needed to retain a modulus suitable as a hot melt adhesive composition and no less than the minimum weight percent needed to obtain the desired phase separation and the desired minimum cohesive strength; and
   (b) an amount of a midblock compatible component wherein said midblock compatible component is at a concentration to maintain the resultant solventless hot melt adhesive composition in a pliable condition at room temperature and to maintain the glass transition temperature of the resultant composition below 10° C.

2. The composition according to claim 1, wherein said silane functionalized polymer component comprises an A'B' block copolymer and a multiblock copolymer having at least two endblocks A and at least one midblock B as described, and an average molecular weight of the A and A' blocks between about 3000 and about 40,000 and said multiblock copolymer has a monoalkenyl arene content of between about 7% and about 45% by weight.

3. The composition according to claim 2, wherein the weight percent of the monoalkenyl arene of the multiblock copolymer is between 10% and 30%wt.

4. The composition according to claim 2, wherein said monoalkenyl arene portion of the silane functionalized polymer component is styrene and said conjugated diene portion of the silane functionalized polymer component is butadiene.

5. The composition according to claim 1, wherein said multi-block copolymer of the silane functionalized polymer component is a selectively hydrogenated linear polystyrene-polybutadiene-polystyrene block copolymer.

6. The composition according to claim 5, wherein said A'B' block copolymer of the silane functionalized polymer component is a selectively hydrogenated polystyrene-polybutadiene block copolymer.

7. The composition according to claim 5, wherein said A'B' block copolymer of the silane functionalized polymer component is a selectively hydrogenated polystyrene-polyisoprene block copolymer.

8. The composition according to claim 2, wherein said multi-block component of the silane functionalized polymer component is a selectively hydrogenated polystyrene-polyisoprene-polystyrene block copolymer.

9. The composition according to claim 2, wherein said multiblock copolymer of the silane functionalized component is a selectively hydrogenated $(A—B—)_a—Y—(C—A)_b$ or $(A—B)_x—Y—C_y$ where A is a poly (monoalkenylarene) block, B and C are poly (conjugated diene) blocks and Y is the residue of a multifunctional coupling agent.

10. The composition according to claim 4, wherein said butadiene portion of the silane functionalized polymer component has a 1,2 configuration of between about 35 and 65 mol percent.

11. The composition according to claim 1, wherein said mid-block compatible component is a member of the group consisting of a midblock compatible resin, a midblock compatible plasticizer and mixtures thereof.

12. The composition according to claim 10, wherein said midblock compatible component is present at up to about 400 parts by weight.

13. The composition of claim 1, further comprising an amount of endblock compatible component wherein said component is at a concentration which is less than the solubility limit of the component in the polymer with utility to maintain the cohesive qualities of the resultant composition at elevated temperatures.

14. The composition of claim 13, wherein said endblock compatible component is an endblock compatible resin.

15. The composition of claim 14, wherein said endblock compatible resin is amorphous polyalphamethyl styrene.

* * * * *

UNITED STATES PATENT AND TRADEMARK OFFICE
CERTIFICATE OF CORRECTION

PATENT NO. : 4,783,504

DATED : November 8, 1988

INVENTOR(S) : David J. St. Clair, et al

It is certified that error appears in the above-identified patent and that said Letters Patent is hereby corrected as shown below:

On the Title Page, item [75], "David J. St. Clair, Steven S. Chin, both of Houston, Tex." should read --David J. St. Clair, Steven S. Chin; Richard Gelles, all of Houston, Tex.--.

Signed and Sealed this

Seventeenth Day of April, 1990

Attest:

HARRY F. MANBECK, JR.

*Attesting Officer*     *Commissioner of Patents and Trademarks*